(12) United States Patent
Harakawa et al.

(10) Patent No.: US 8,421,302 B2
(45) Date of Patent: Apr. 16, 2013

(54) ROTATING ELECTRICAL MACHINE AND COIL

(75) Inventors: Takashi Harakawa, Yokohama (JP);
Tetsushi Okamoto, Kawasaki (JP);
Yoshiyuki Inoue, Yokohama (JP); Tooru Ootaka, Kawasaki (JP); Hiroshi Hatano, Chofu (JP); Mikio Kakiuchi, Yokohama (JP); Toshihiko Shinoda, Yokohama (JP); Makoto Kawahara, Yokohama (JP); Masashi Kobayashi, Kawasaki (JP); Wataru Nakamura, Yokohma (JP); Ken Nagakura, Ebina (JP); Masamitsu Sakuma, Yokohama (JP)

(73) Assignee: Kabushiki Kaisha Toshiba (JP)

( * ) Notice: Subject to any disclaimer, the term of this patent is extended or adjusted under 35 U.S.C. 154(b) by 294 days.

(21) Appl. No.: 12/892,098

(22) Filed: Sep. 28, 2010

(65) Prior Publication Data

US 2011/0074241 A1    Mar. 31, 2011

(30) Foreign Application Priority Data

Sep. 29, 2009   (JP) .................. 2009-225027
Jul. 27, 2010   (JP) .................. 2010-168522

(51) Int. Cl.
*H02K 3/00*      (2006.01)

(52) U.S. Cl.
USPC .......................................... 310/260; 310/196

(58) Field of Classification Search .......... 310/196, 310/260, 270
See application file for complete search history.

(56) References Cited

FOREIGN PATENT DOCUMENTS

| JP | 61177134 A | * | 8/1986 |
|---|---|---|---|
| JP | 62152345 A | * | 7/1987 |
| JP | 06-292334 | | 10/1994 |
| JP | 2001-275293 | | 10/2001 |
| JP | 2008-054405 | | 3/2008 |
| JP | 4091402 | | 3/2008 |

* cited by examiner

*Primary Examiner* — Tran Nguyen
(74) *Attorney, Agent, or Firm* — Harness, Dickey & Pierce, P.L.C.

(57) ABSTRACT

According to one embodiment, there is provided a rotating electrical machine including a core, a coil extending from the core, and an electromagnetic shield which is provided outside the core, and has a plurality of shoulders projecting toward the coil. The coil includes an insulator covering outside of a conductor, a resistance layer formed on a surface of the insulator and contacting the core, and at least one potential grading layer formed on a surface of the insulator adjacent to the resistance layer. A boundary between the resistance layer and potential grading layer is provided at a position farther from the core than a point on a surface of the coil, where a distance between the coil and a shoulder of the electromagnetic shield closest to the core is the shortest.

20 Claims, 6 Drawing Sheets

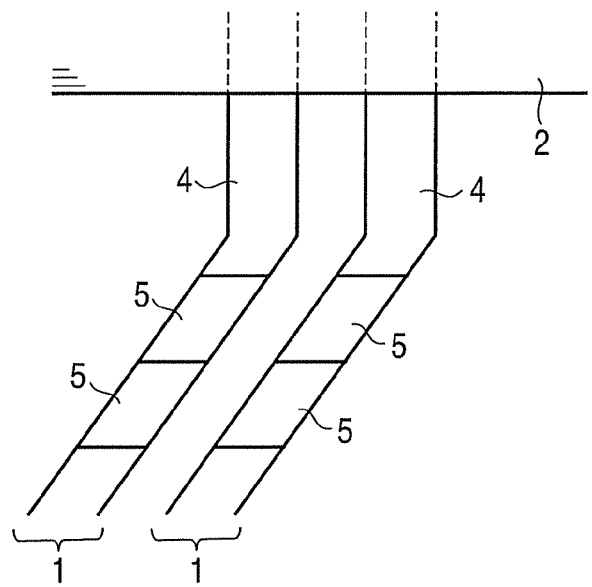
F I G. 3
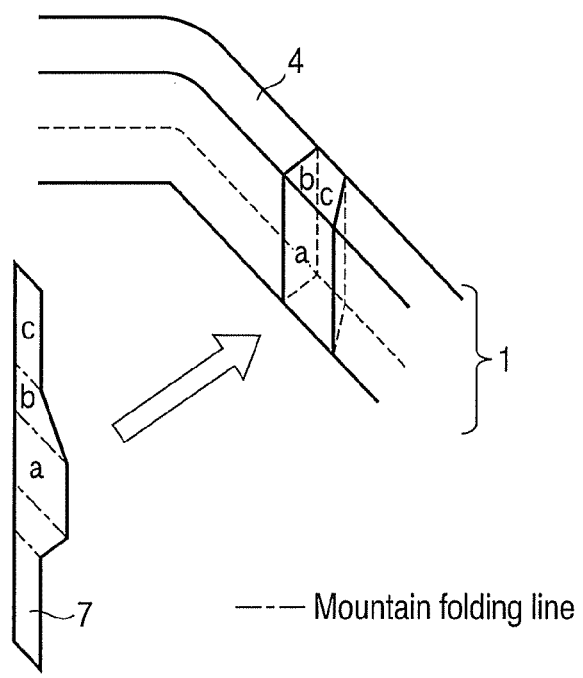
——— Mountain folding line
F I G. 4

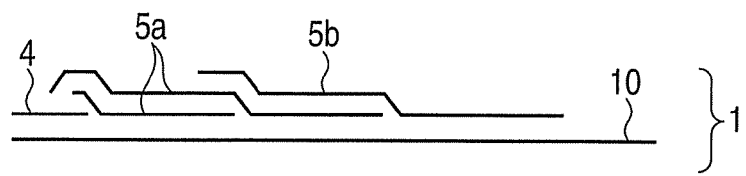
F I G. 9
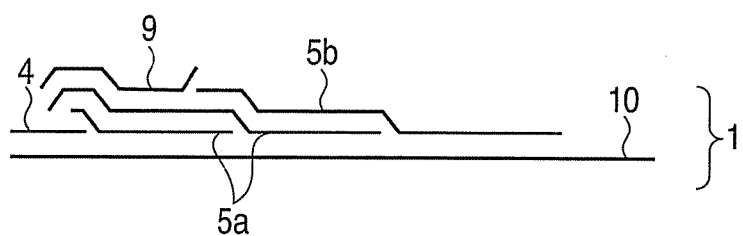
F I G. 10
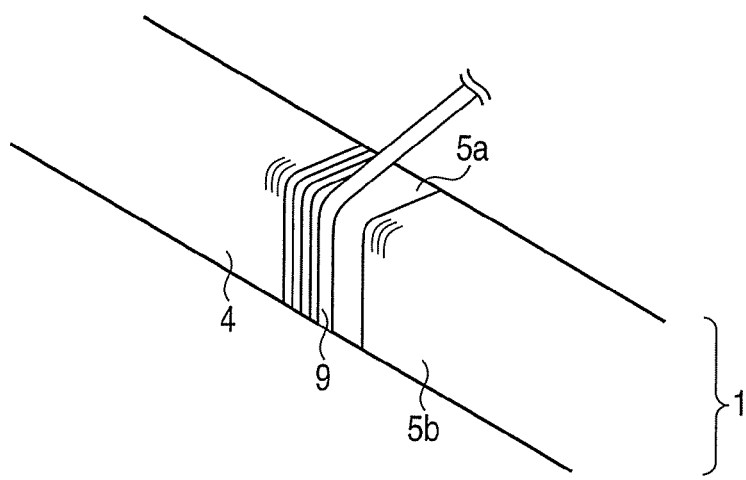
F I G. 11

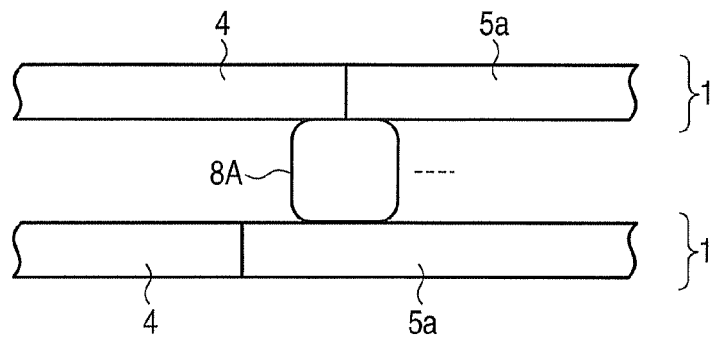
FIG. 12
| Antiphase / In-phase | Protective winding | Distance from low-resistance layer end to binding member [mm] | | | | | | | | | | |
|---|---|---|---|---|---|---|---|---|---|---|---|---|
| | | 0 | 20 | 40 | 60 | 80 | 100 | 120 | 140 | 160 | 180 | 200 |
| Antiphase | Absent | ○ | ○ | × | × | ○ | × | × | ○ | ○ | ○ | ○ |
| | Present | ○ | ○ | ○ | ○ | ○ | ○ | ○ | ○ | ○ | ○ | ○ |
| In-phase | Absent | ○ | ○ | ○ | ○ | × | × | × | × | ○ | ○ | ○ |
| | Present | ○ | ○ | ○ | ○ | ○ | ○ | ○ | ○ | ○ | ○ | ○ |
○ Not burnt
× Burnt
FIG. 13
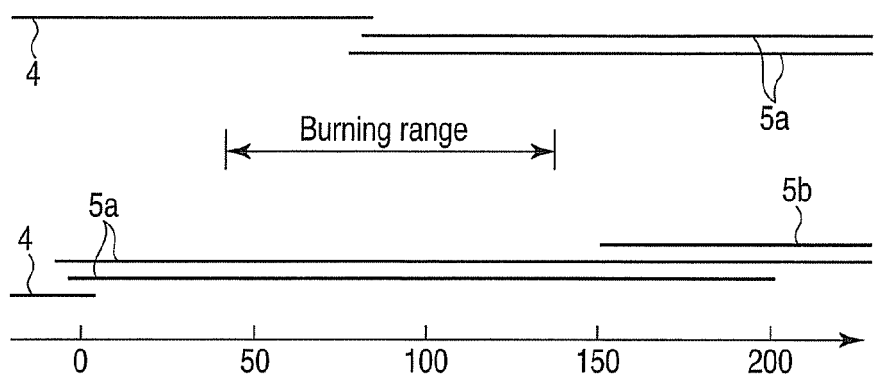
FIG. 14

ROTATING ELECTRICAL MACHINE AND COIL

CROSS-REFERENCE TO RELATED APPLICATIONS

This application is based upon and claims the benefit of priority from Japanese Patent Applications No. 2009-225027, filed Sep. 29, 2009; and No. 2010-168522, filed Jul. 27, 2010; the entire contents of both of which are incorporated herein by reference.

FIELD

Embodiments described herein relate generally to a rotating electrical machine having a structure to prevent electrical discharge from a stator coil to peripheral grounding structures, and a coil used for the rotating electrical machine.

BACKGROUND

Conventionally, in a stator coil of a rotating electrical machine, a low-resistance layer is provided on the surface of a coil to prevent discharge in a slot made between a core and a coil.

For example, there is a technique in which a potential grading layer is provided at the end of a low-resistance layer to prevent discharge on the surface of the low-resistance layer during operation of a rotating electrical machine.

Moreover, there is a technique in which a potential grading layer is obliquely provided to prevent discharge between adjacent coils at a coil end.

However, in the conventional technique, though discharge can be prevented in a coil slot, at a core end, and between adjacent coils, discharge for peripheral grounding structures such as an electromagnet shielding plate cannot be prevented. To reduce the length of shaft of a stator, it is effective to greatly bend the end of a coil. In this structure, the distance from the stator coil to a peripheral grounding structure is reduced, and discharge may occur between the stator coil and peripheral grounding structure. Hereinafter, an electromagnetic shielding plate is taken as an example of peripheral grounding structures.

Since an electromagnetic shielding plate is grounded, a stator coil is designed not to cause discharge. Specifically, a stator coil is designed by determining the distance between a stator coil and an electromagnetic shielding plate by the surface potential of a stator coil close to an electromagnetic shielding plate. Therefore, bending of a coil end is limited, and it is difficult to reduce the length of a stator shaft.

In the above circumstances, it is desired to provide a rotating electrical machine, which realizes compactness without decreasing operating voltage, and a coil used for the rotating electrical machine.

BRIEF DESCRIPTION OF THE DRAWINGS

FIG. 3 is a plan view showing the structure of a stator coil of a rotating electrical machine according to a third embodiment, viewed from the central axis of the stator;

FIG. 4 is a diagram explaining a method of forming an end portion of a low-resistance tape parallel to the surface of a core in the third embodiment;

FIG. 9 is a diagram showing an intermediate process of forming a stator coil of a rotating electrical machine according to a fifth embodiment;

FIG. 10 is a diagram showing a final process of forming the stator coil of the rotating electrical machine according to the fifth embodiment;

FIG. 11 is a diagram showing an example of forming an insulating layer of the stator coil of the rotating electrical machine according to the fifth embodiment, by binding an insulating tape;

FIG. 12 is a diagram showing an example of a burning test in the fifth embodiment;

FIG. 13 is a table showing the results of the burning test of FIG. 12; and

FIG. 14 is a diagram showing a burning range shown in the results of the burning test of FIG. 12.

DETAILED DESCRIPTION

Embodiments will be described below with reference to the drawings.

In general, according to one embodiment, there is provided a rotating electrical machine including a core, a coil extending from the core, and an electromagnetic shield which is provided outside the core, and has a plurality of shoulders projecting toward the coil. The coil includes an insulator covering outside of a conductor, a resistance layer formed on a surface of the insulator and contacting the core, and at least one potential grading layer formed on a surface of the insulator adjacent to the resistance layer. A boundary between the resistance layer and potential grading layer is provided at a position farther from the core than a point on a surface of the coil, where a distance between the coil and a shoulder of the electromagnetic shield closest to the core is the shortest.

(First Embodiment)

A first embodiment will be explained with reference to FIGS. 1 and 2.

Figure 1:
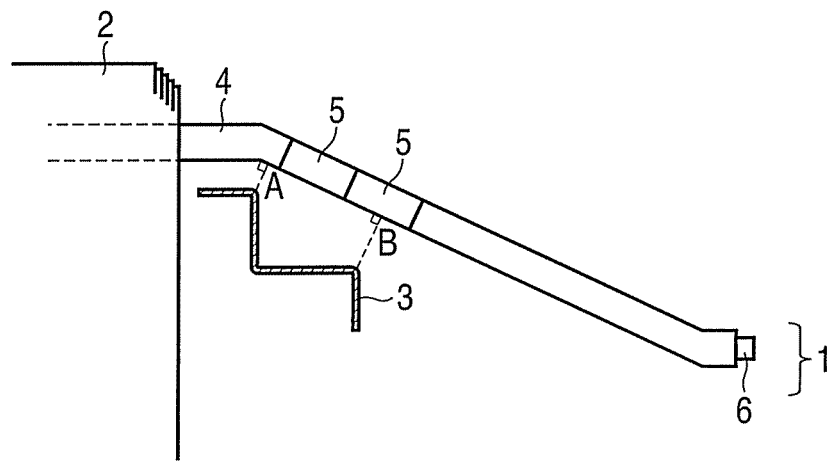
FIG. 1 is a side view showing the structure of a stator coil of a rotating electrical machine according to a first embodiment, viewed from a direction perpendicular to the central axis of the stator.

FIG. 1 is a side view showing the structure of a stator coil of a rotating electrical machine according to a first embodiment, viewed from the direction perpendicular to the central axis of the stator. FIG. 2 is a plan view showing the structure of the stator coil of the rotating electrical machine according to the first embodiment, viewed from the central axis of the stator.

The rotating electrical machine comprises a coil 1, a core 2, and an electromagnetic shielding plate 3. The coil 1 is a stator coil extended from the core 2 and bent three-dimensionally to reduce the dimensions of a stator.

The core 2 is shaped like a pineapple of several to several tens of meters by laminating thin ferrous plates, and is electrically grounded. The core 2 has a slot to house the coil 1, and contains the coil 1 in the slot.

The electromagnetic shielding plate 3 is a peripheral grounding structure provided outside the core 2 to prevent flux leakage from the core 2, and is shaped stepwise having a plurality of shoulders projecting toward the coil 1. The electromagnetic shielding plate 3 is electrically grounded, and its potential is zero.

Figure 2:
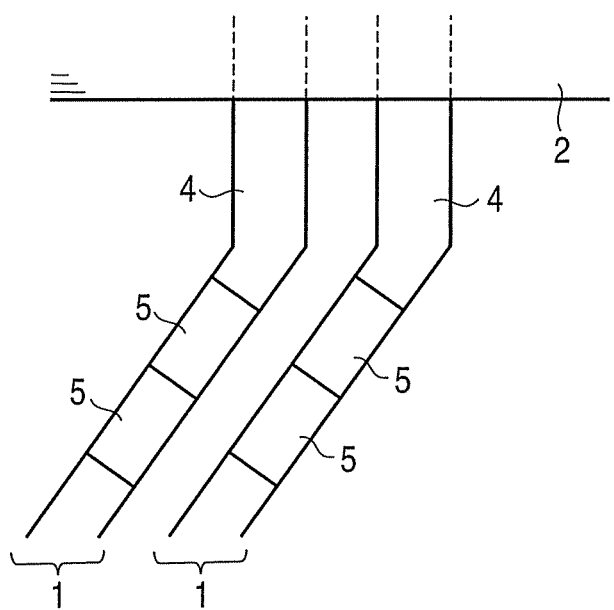
FIG. 2 is a plan view showing the structure of the stator coil of the rotating electrical machine according to the first embodiment, viewed from the central axis of the stator.

The core 2 is actually provided with two upper and lower coils, but only the lower coil 1 is shown in FIGS. 1 and 2 to simplify the relationship with the peripheral grounding structure.

The coil 1 comprises an insulator (not shown) covering the outside of a conductor, a low-resistance layer 4 formed on the surface of the insulator and contacting the core 2, and at least one potential grading layer 5 (here, a plurality of potential grading layers 5) formed on the surface of the insulator adjacent to the low-resistance layer 4. The coil 1 has a lead-out 6 at the distal end.

Particularly, as shown in FIG. 1, in the coil 1 of the embodiment, a boundary between the low-resistance layer 4 and potential grading layer 5 is provided at a position farther from the core 2 than point A on the surface of the coil 1, where the distance between the coil 1 and the shoulder of the electromagnetic shielding plate 3 closest to the core 2 is the shortest, in the direction retreating from the core 2 (in the direction approaching the lead-out 6). Point B in FIG. 1 will be explained in a second embodiment.

More specifically, the low-resistance layer 4 has a surface resistivity of $10\Omega$ to $1 M\Omega$, and a boundary between the low-resistance layer 4 and potential grading layer 5 is provided in an area from a position displaced 30 mm from point A on the surface of the coil 1 along the surface of the coil 1 in the direction retreating from the core 2 (in the direction of the lead-out 6), to a position displaced 100 mm from the lead-out 6 along the surface of the coil 1 in the direction approaching the core 2. Hence, discharge does not occur at point A.

When the coil 1 is produced, for example, a mica tape is wound around a conductor by predetermined times, and the low-resistance layer 4 is provided at least in an area contacting the core 2 to prevent dielectric degradation caused by a partial discharge. On or more potential grading layer 5 is provided in an area from the end to outside of the low-resistance layer 4 to prevent a creeping discharge caused by concentration of electrical fields. A joint (boundary) between the low-resistance layer 4 and potential grading layer 5 is provided at a position farther than point A in the direction retreating toward the lead-out 6. The potential grading layer 5 is formed adjacent to the low-resistance layer 4.

Now, a method of manufacturing the coil 1 is explained in detail.

First, a conductor is made by binding insulated wires. At this time, the insulated wires are bound by rotating along the length of the conductor, to prevent heating caused by a skin effect.

The surface of the conductor on which the bound wires are crossed becomes uneven, and a semiconductive filler of $10^4$ to $10^6$ $\Omega/cm$ is used on the uneven surface. The filler is a prepreg sheet made by coating both surfaces of nonwoven glass fabric with epoxy varnish blended with carbon and mica powder.

Then, an internal shield with a surface resistivity of $10^2$ to $10^4 \Omega$ is provided on the outside of the conductor to prevent a partial discharge in the insulating layer. The internal shield is a prepreg tape made by thermally curing nonwoven polyester fabric, base material, evenly impregnated with conductive varnish mixed with carbon particles. The tape is wound in a 3-mm lap.

Next, an insulating layer is formed by winding a tape in a half lap by several to several tens of times to insulate the conductor and core 2. The insulating layer is a prepreg tape made by sticking mica paper to a reinforcement material such as glass cloth by using varnish as an adhesive, and thermally curing the material.

Next, the low-resistance layer 4 with a surface resistivity of $10\Omega$ to $1 M\Omega$ is provided to prevent discharge between the core 2 and coil 1 during operation. The position of the low-resistance layer is as described above. The low-resistance layer 4 is a prepreg tape made by evenly applying polyester varnish blended with carbon to a reinforcement material, such as glass cloth, and thermally curing the material.

Next, the potential grading layer 5 is formed adjacent to the low-resistance layer 4 to prevent a creeping discharge caused by a sudden change in the surface potential at the end of the low-resistance layer 4. The potential grading layer 5 is a prepreg tape made by evenly coating a reinforcement material, such as glass cloth, with epoxy varnish blended with SiC as an adhesive, and thermally curing the material. The prepreg tape can change a resistance value by adjusting the blended amount of SiC. By using it, a potential gradient on the coil surface is made gentle by adjoining a plurality of potential grading layer 5 with different resistance values. In this embodiment, for example, two kinds of potential grading layer 5 are adjoined.

The coil is reinforced with a metal or fiber-reinforced plastic (FRP) plate, which can be formed in a desired shape, and the FRP plate is held by a heat-shrinkable tape.

The coil formed in this way is heated to approximately 100° C. in a tank, while being held under vacuum of 2 torr or less. Then, a polyethylene compound heated to 150° C. is allowed to flow into the tank, until the coil is completely immersed. At the same time, inactive gas is added and pressurized at 7 kg/cm². Then, the coil is thermally cured by keeping the polyethylene compound at 150° C. for 10 hours.

After being sufficiently cured, the temperature is lowered while decreasing the pressure.

Finally, the coil is taken out of the tank, and the FRP plate is removed from the coil. The coil 1 is then completely produced.

Next, the function of the rotating electrical machine of this embodiment will be explained.

When a voltage is supplied to the conductor of the coil 1, the surface potential of the potential grading layer 5 gradually increases from the end of the low-resistance layer 4, which is at a ground potential, toward the coil. When a field on the coil surface field exceeds a field to start discharge at point A where the coil 1 comes closest to the core 2, generally, discharge occurs at point A. In this embodiment, since the end of the low-resistance layer 4, which is at a ground potential, is placed at a position farther than point A in the direction of the lead-out 6, discharge does not occur at point A.

As described above, according to the first embodiment, since the joint (boundary) between the low-resistance layer 4 and potential grading layer 5 is provided at a position farther than point A in the direction of the lead-out 6, the potential in this area is zero, the potential is not different between the coil 1 and the above-mentioned shoulder, and discharge can be prevented. Therefore, the electromagnetic shielding plate 3 can be placed close to the coil 1, and the size of the rotating electrical machine can be reduced.

(Second Embodiment)

A second embodiment will be explained by referring again to FIGS. 1 and 2.

In the second embodiment, the following configuration is added to the first embodiment. Namely, the boundary (joint) between the low-resistance layer 4 and potential grading layer 5 in the coil 1 and the boundary (joint) between the adjacent potential grading layers 5 are not provided at points on the surface of the coil 1 (i.e., points A and B), respectively, on the surface of the coil 1, where the distance from the coil 1 to each shoulder of the electromagnetic shielding plate 3 is the shortest. In other words, the points on the surface of the coil 1 (i.e., points A and B) opposing to the respective shoulders of the electromagnetic shielding plate 3, are displaced from each joint.

A method of manufacturing the coil 1 is the same as that described in the first embodiment, and is omitted.

Now, the function of the rotating electrical machine of this embodiment will be explained.

In a rotating electrical machine with a high rated voltage, two or more potential grading layers 5 with different resistance may be combined. Further, as described above, the coil 1 of the rotating electrical machine is bent in the radial direction of the stator, and the distance from the core 2 is different in the outside and inside of the bent end. Since the potential gradient is different at the joint between the low-resistance layer 4 and potential grading layer 5 and at the joint between potential grading layers with difference resistance, the potential difference between adjacent coils increases. Hence, discharge occurs between adjacent coils. At this time, additional discharge may be induced in the area discharging electricity, because the potential on the surface of the coil 1 is greatly change by the discharge, or caused by the ionized gas generated by the discharge. Therefore, if the joint between the low-resistance layer 4 and potential grading layer 5, or the joint between the potential grading layers 5 with different resistance, is placed at point A or B on the coil surface close to the magnetic shielding plate 3, the possibility of inducing an extreme discharge is increased. In this embodiment, the joints are not placed at such points, and an extreme discharge can be prevented.

As described above, according to the second embodiment, in addition to the effects obtained by the first embodiment, points A and B on the surface of the coil 1 opposed to each shoulder of the electromagnetic shielding plate 3 are not placed at the joints, and discharge between the coil 1 and electromagnetic shielding plate 3 can be prevented still further.

(Third Embodiment)

A third embodiment will be explained with reference to FIG. 3 to FIG. 6.

FIG. 3 is a plan view showing the structure of a stator coil of a rotating electrical machine according to a third embodiment, viewed from the central axis of the stator. The elements common to those in FIGS. 1 and 2 are denoted by the same reference numbers.

In the third embodiment, a boundary between a low-resistance layer 4 and a potential grading layer 5 in a coil 1 and a boundary between adjacent potential grading layers 5 are different from those in the first and second embodiments. In other words, in the third embodiment, the boundary between the low-resistance layer 4 and potential grading layer 5 in the coil 1 and the boundary between adjacent potential grading layers 5 are parallel to the surface of the core 2, from which the coil 1 extends.

The low-resistance layer 4 is, generally, formed by manually winding a low-resistance tape around an insulator formed on a conductor. At this time, if the tape is wound in a lap, it is difficult to make the end of low-resistance tape parallel to the surface of the core 2 in the bent end. Hence, in the embodiment 3, first, the low-resistance layer 4 in the first embodiment is provided in the same way as shown in the first embodiment, and then the sheet of the same composition as the low-resistance layer 4 in the first embodiment is wound, or paint, whose surface resistivity adjusted to a range of 10Ω to 1 MΩ by A-stage resin impregnated with solvent and blended with carbon, is coated, parallel to the surface of the core 2. Similarly, in the potential grading layer 5, the sheet is wound, or the paint with the adjusted surface resistivity is coated, parallel to the core 2.

Now, a method of manufacturing the coil 1 will be explained in detail.

The process up to the formation of an insulating layer on a conductor is as described in the first embodiment.

Next, a low-resistance layer 4 is formed. The low-resistance layer 4 uses a low-resistance tape explained in the first embodiment. A low-resistance tape is wound around the insulating layer once or more in a half lap. The tape winding range is as explained in the first embodiment. In this state, the end of the low-resistance tape is almost perpendicular to the length of the tape.

Next, a low-resistance sheet 7 is bent, and stuck to the end of the low-resistance tape in one layer, as shown in FIG. 4, to form the end portion of the low-resistance tape parallel to the surface of the core 2. The low-resistance sheet 7 is temporarily fixed at a predetermined position by a belt or the like. Labels a, b, c in FIG. 4 indicate the correspondence to respective parts of the low-resistance sheet 7 after the sheet is stuck.

The low-resistance sheet 7 uses a prepreg sheet, which is made by applying and drying paint made by mixing field-reducing resin and carbon glass, to polyester fabric or non-woven cloth with a surface resistivity of 10Ω to 1 MΩ.

Next, a potential grading layer 5 is formed adjacent on the low-resistance sheet 7. The potential grading layer 5 uses the SiC high-resistance tape shown in the first embodiment. The high-resistance tape is wound on the insulating layer once or more in a half lap. The tape winding range is as explained in the first embodiment. If the surface potential of the coil 1 does not increase to a predetermined value at the end of the high-resistance tape, a high-resistance sheet is prepared similarly for the end of a low-resistance tape, and is formed parallel to the surface of the core 2.

Now, the function of the rotating electrical machine of this embodiment is explained. An explanation is given by comparing the third embodiment with the first embodiment by referring to FIGS. 5 and 6.

Figure 5:
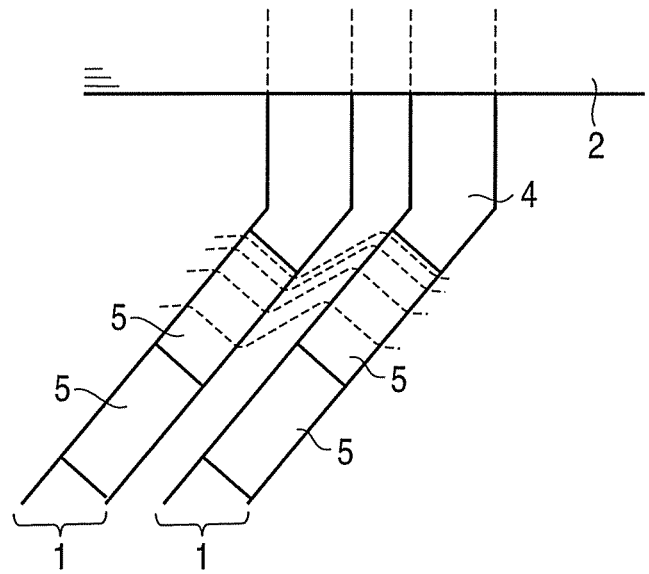
FIG. 5 is a diagram having an equipotential line in the plan view showing the structure of the stator coil of the rotating electrical machine according to the first embodiment shown in FIG. 2.
Figure 6:
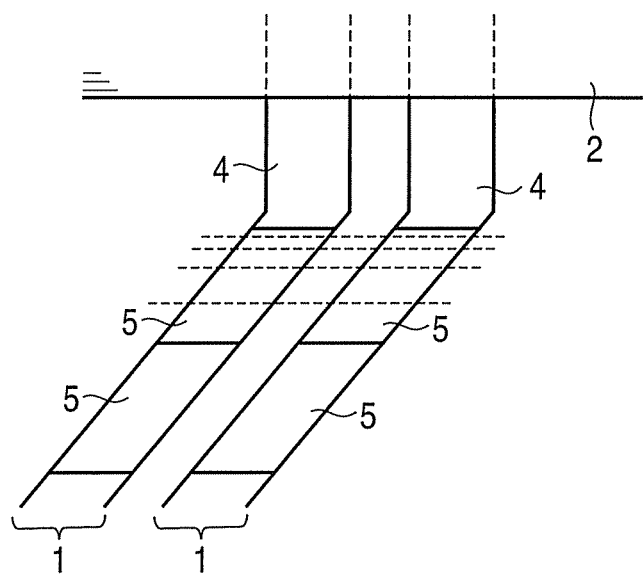
FIG. 6 is a diagram having an equipotential line in the plan view showing the structure of the stator coil of the rotating electrical machine according to the third embodiment shown in FIG. 3.

FIG. 5 is a diagram having an equipotential line in the plan view showing the structure of the stator coil of the rotating electrical machine according to the first embodiment shown in FIG. 2. FIG. 6 is a diagram having an equipotential line in the plan view showing the structure of the stator coil of the rotating electrical machine according to the third embodiment shown in FIG. 3.

In the first embodiment, as shown in FIG. 5, when a voltage is supplied to a conductor of the coil, a certain potential distribution is formed in the potential grading layer 5, but as the distribution is determined by the distance from the end of the low-resistance layer 4, the potential distribution on the surface of the coil 1 with respect to the axial direction of the core 2 becomes uneven. Therefore, a potential gradient is sharp between adjacent coils, and a field is increased.

On the other hand, in the third embodiment, as shown in FIG. 6, the distance from the end of the low-resistance layer 4 is equal at all the points on the surface of the coil 1, where the distance from the core shaft is equal, and the potential distribution on the surface of the coil 1 with respect to the axial direction of the core 2 becomes even.

As described above, according to the third embodiment, in addition to the effects obtained in the first and second embodiments, the potential distribution on the surface of the coil 1 can be even with respect to the axial direction of the core 2, and discharge in this area can be prevented.

(Fourth Embodiment)

A fourth embodiment will be explained with reference to FIGS. 7 and 8.

Here, an explanation will be given of a method of preventing a current flowing in a binding member binding adjacent coils, and burning of the binding member by the current flow, during a breakdown test of a rotating electrical machine.

Figure 7:
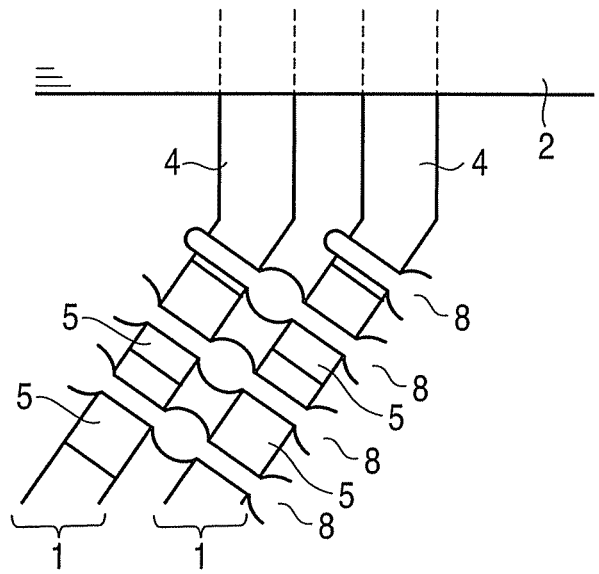
FIG. 7 is a diagram showing the state that adjacent coils of the stator coil shown in FIG. 2 are bound by a binding member for a breakdown test.

FIG. 7 is a diagram showing the state that adjacent coils of the stator coil shown in FIG. 2 are bound by a binding member 8 for a breakdown test. FIG. 8 is a diagram showing the state that adjacent coils of a stator coil of a rotating electrical machine according to a fourth embodiment are bound by a binding member 8 for a breakdown test.

Figure 8:
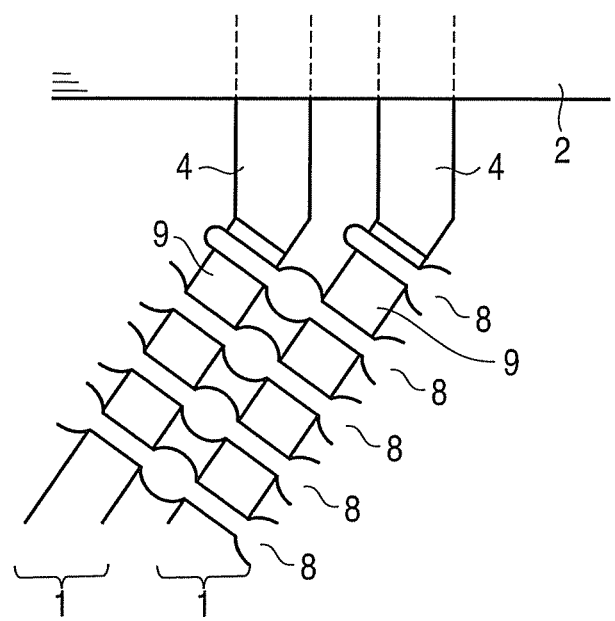
FIG. 8 is a diagram showing the state that adjacent coils of a stator coil of a rotating electrical machine according to a fourth embodiment are bound by a binding member for a breakdown test.

As seen by comparing FIGS. 7 and 8, the fourth embodiment has the following configuration in addition to the configuration of the first embodiment. Namely, in FIG. 8, unlike in FIG. 7, an insulating layer 9 (protective winding) is formed on the surface of at least a potential grading layer 5 in a coil 1. Further, an insulating layer 9 includes an inorganic filler (not shown) resistant to discharging. The insulating layer 9 may be formed overlapping with a low-resistance layer 4. After the breakdown test, the insulating layer 9 and binding member 8 become unnecessary, but the insulating layer 9 may not be removed. In this case, the cost to remove the insulating layer 9 is saved.

The insulating layer 9 is formed with an extra portion of 20 mm, for example, in the area from both ends to the outside of the potential grading layer 5, to completely cover the potential grading layer 5. A mica tape is used for the insulating layer 9. The mica tape is wound in one or more layers in a half lap.

Further, by using an inorganic filler highly resistant to discharging, the insulating layer 9 can prevent a puncture by discharge and becoming conductive, thereby providing stable performance. The inorganic filler may be mica, silica, alumina, boron nitride, hydrated alumina, and magnesium oxide, etc. A desirable rate of inorganic filler content is 20 to 90% in weight percent.

Now, a method of manufacturing the coil 1 for a breakdown test is explained in detail.

After the potential grading layer 5 is formed as described in the first embodiment, the insulating layer 9 is formed to cover the whole surface of the potential grading layer 5. The insulating layer 9 is formed by sticking mica paper to a reinforcement material, such as glass cloth, by using varnish as an adhesive, and winding a thermally cured prepreg tape. The tape is wound in one or more layers in a half lap in the area from the position 20 mm closer to the core than the joint between the low-resistance layer 4 and potential grading layer 5, to the position 20 mm closer to the lead-out 6 than the end of the potential grading layer 5. At this time, the insulating layer 9 may be formed overlapping with the low-resistance layer 4.

Thereafter, the coil 1 is completed by thermal curing as described in the first embodiment.

Now, the function of the rotating electrical machine of this embodiment is explained.

Since the coil end is bent as explained in the second embodiment, the potential is different in the opposing areas of adjacent coils.

The coil end may be tied with a rope made by binding glass fibers, or a filler such as felt may be packed between the coils, to protect the coil end against oscillation during operation. These members are the binding member 8 in FIG. 8. The binding member 8 keeps the binding force by impregnating with uncured resin and hardening it after binding coils. If a voltage is supplied in the uncured state, the resistance is low, and a current corresponding to a potential difference flows in the binding member. When the potential difference is high or the resistance is low in the uncured state, a large current may flow and burn the binding member. In this embodiment, the insulating layer is provided on the surface of the potential grading layer 5, which may cause a potential difference, and a current does not flow in the binding member 8, causing no burning.

As described above, according to the fourth embodiment, in addition to the effects obtained by the first and second embodiments, a current flowing in adjacent coils is interrupted by the insulating layer 9, and a current does not flow in the binding member 8 with a low resistance, and burning of the binding member 8 can be prevented.

(Fifth Embodiment)

A fifth embodiment will be explained with reference to FIGS. 9 to 13.

A modification of the configuration of the fourth embodiment shown in FIG. 8 is explained in the fifth embodiment. The elements common to those in FIG. 8 are denoted by the same reference numbers, and an explanation thereof is omitted. Only the parts different from those in FIG. 8 are explained.

In the configuration of the fourth embodiment shown in FIG. 8, the insulating layer 9 (protective winding) is formed to cover the whole surface of the potential grading layer 5, to interrupt leakage of current to the binding member 8 to prevent burning of the binding member 8. Hence, the insulating layer 9 is made of material much more than necessary. To avoid the amount of wasted material of the insulating layer 9, the fifth embodiment proposes a configuration to decrease the amount of material used for the insulating layer 9 without burning the binding member 8.

In the fifth embodiment, the insulating layer 9 is formed to cover a part of, not the whole surface, the potential grading layer 5. Specifically, the insulating layer 9 is formed in a certain area of the whole surface of the potential grading layer 5, started from a joint between the low-resistance layer 4 and potential grading layer 5.

Further, in the fifth embodiment, the potential grading layer 5 comprises two layers with different resistance, a low-resistance potential grading layer 5a and a high-resistance potential grading layer 5b. Thus, the potential gradient on the coil surface becomes gentler.

In a method of manufacturing the coil 1, similar to the first embodiment, an insulating layer (an insulator covering the outside of a conductor) 10 is formed by winding a mica tape around a conductor by predetermined times, as shown in FIG. 9, and a low-resistance layer 4 is formed at least in an area contacting the core 2 to prevent dielectric degradation caused by a partial discharge. A plurality of low-resistance potential grading layers 5a is formed in the area from the end to outside of the low-resistance layer 4, to prevent a creeping discharge caused by concentration of electrical fields, and the high-resistance potential grading layer 5b is displaced close to the lead-out. At this time, the low-resistance potential grading layer 5a is formed adjacent to the low-resistance layer 4.

Further, the insulating layer 9 is formed on the surface of a part of the potential grading layer 5, for example, as shown in FIG. 10, on the surface of the low-resistance potential grading layer 5a, that is, the area from the joint between the low-resistance layer 4 and low-resistance potential grading layer 5a, to the end of the high-resistance potential grading layer 5b close to the core. The area to form the insulating layer 9 is not limited to the above area. For example, the insulating layer 9 may be formed over a part of the low-resistance layer 4, or a part of the high-resistance potential grading layer 5b.

A method of manufacturing the coil 1 is as explained in the first embodiment, except for a method of forming the low-resistance potential grading layer 5a, high-resistance potential grading layer 5b, and insulating layer 9. Hereinafter, a detailed explanation will be given of a method of forming the low-resistance potential grading layer 5a, high-resistance potential grading layer 5b, and insulating layer 9.

After the low-resistance layer 4 is formed, taking the end of the low-resistance layer 4 as a start point and the area close to the lead-out as positive, a low-resistance potential grading layer 5a is formed in an area −20 to 200 mm, a low-resistance potential grading layer 5a is formed in an area −30 to 400 mm over the first layer 5a, and a high-resistance potential grading layer 5b is formed in an area 150 to 640 mm outside the second layer 5a.

The low-resistance potential grading layer 5a is a prepreg glass tape with a surface resistance of $10^7$ to $10^9 \Omega$/original width, which uses a glass tape, for example, as a base material, and is formed by coating both sides of the glass tape with semiconductive varnish blended and evenly kneaded with epoxy varnish, blended with silicon carbide (SiC) selected to add nonlinear characteristics, and is appropriately dried by heating.

The high-resistance potential grading layer 5b is a prepreg glass tape with a surface resistance of $10^9$ to $10^{11} \Omega$/original width, which uses a glass tape, for example, as a base material, and is formed by coating both sides of the glass tape with semiconductive varnish blended and evenly kneaded with epoxy varnish, blended with silicon carbide (SiC) selected to add nonlinear characteristics and ferrosoferric oxide (Fe304) to adjust the semiconductivity, and is appropriately dried by heating.

The insulating layer 9 is formed on the surface of a part of the whole surface of the potential grading layer 5, at the joint between the low-resistance layer and low-resistance potential grading layer 5a and in an area having a surface resistance of $10^9 \Omega$ or lower (part of the low-resistance potential grading layer 5a in this example). The insulating layer 9 is formed by winding an insulating tape, which is made by mica paper mixed with glass cloth, for example, and impregnated with resin, around the low-resistance layer, as shown in FIG. 11.

Next, an explanation will be given of a preferable area to form the insulating layer 9 based on a burning test, with reference to FIGS. 12 to 14.

In a burning test, first, as shown in FIG. 12, two coils 1 are arranged parallel with a gap of 12.5 mm, one of the coils is displaced 80 mm along the longitudinal direction (for example, toward the lead-out), and a 60-mm-wide pseudo-binding member 8A with a resistance of 5 MΩ is placed between the coils. Then, the distance from the surface of the low-resistance layer 4 of the other coil to the pseudo-binding member 8A is measured. Then, an alternating voltage of 49 kV is applied to the coil conductor, and whether the pseudo-binding member 8A is burnt is checked, thereby verifying effects.

Specifically, burning of the pseudo-binding member 8A according to the distance from the low-resistance potential grading layer 5a to the pseudo-binding member 8A is determined by dividing the phases of the current flowing in two coils 1 into antiphase and in-phase, and depending on whether the insulating layer (protective winding) 9 is present or absent. The results of the burning test are shown in FIG. 13.

According to the results in FIG. 13, it is seen that when the insulating layer 9 (protective winding) is absent, the burning occurs in a range of 40 to 140 mm from the joint between the low-resistance layer 4 and low-resistance potential grading layer 5a. FIG. 14 is a conceptual diagram visually expressing the range of burning in this burning test.

According to the above results, it is seen that when the insulating layer 9 (protective winding) is absent, burning occurs when the binding member 8A is placed over the joint between the low-resistance layer 4 and low-resistance potential grading layer 5a of the coil 1, and is placed over a potential grading layer having a surface resistance of $10^9 \Omega$ or lower.

Therefore, the insulating layer 9 is formed only at the joint between the low-resistance layer 4 and low-resistance potential grading layer 5a, and in an area having a surface resistance of $10^9 \Omega$ or lower (part of the low-resistance potential grading layer 5a), in the whole surface of the potential grading layer 5. The effects are verified in this configuration, and burning can be prevented.

As described above, according to the fifth embodiment, in addition to the effects obtained by the fourth embodiment, the using amount of material can be decreased without burning a binding member.

As described herein, according to the embodiments, there can be provided a rotating electrical machine, which realizes compactness without decreasing operating voltage, and a coil used for the rotating electrical machine.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rotating electrical machine comprising:
   a core;
   a coil extending from the core; and
   an electromagnetic shield that is provided outside the core, and has a plurality of shoulders projecting toward the coil;
   the coil comprising an insulator covering outside of a conductor, a resistance layer formed on a surface of the insulator and contacting the core, and at least one potential grading layer formed on a surface of the insulator adjacent to the resistance layer, and
   a boundary between the resistance layer and potential grading layer being provided at a position farther from the core than a point on a surface of the coil, wherein said point is defined by a shortest distance between the coil and a closest shoulder of the electromagnetic shield with respect to the core.

2. The rotating electrical machine according to claim 1, wherein:
   the resistance layer has a surface resistivity of 10Ω to 1 MΩ, and
   the boundary between the resistance layer and potential grading layer is provided in an area, wherein said area is defined between a first and a second position, said first position displaced 30 mm, from a point on a surface of the coil along a surface of the coil in a direction departing the core, and said second position displaced 100 mm, from a lead-out of the coil along a surface of the coil in a direction approaching the core.

3. The rotating electrical machine according to claim 1, wherein the boundary between the resistance layer and potential grading layer, and a boundary between adjacent potential grading layers, are not placed at each position on a surface of the coil, where a distance between the coil and each shoulder of the electromagnetic shield is the shortest.

4. The rotating electrical machine according to claim 1, wherein a boundary between the resistance layer and potential grading layer, and a boundary between adjacent potential grading layers, are parallel to a surface of the core, from which the coil extends.

5. The rotating electrical machine according to claim 1, wherein the coil further comprises an insulating layer formed on a surface of at least the potential grading layer.

6. The rotating electrical machine according to claim 1, wherein the coil further comprises an insulating layer formed on a surface of a part of the potential grading layer.

7. The rotating electrical machine according to claim 6, wherein the insulating layer is formed on a surface of a certain area starting from a joint between the resistance layer and potential grading layer, in a whole surface of the potential grading layer.

8. The rotating electrical machine according to claim 6, wherein the insulating layer is formed at a joint between the resistance layer and potential grading layer, and on a surface of a part having a surface resistance of $10^9 \Omega$ or less, in a whole surface of the potential grading layer.

9. The rotating electrical machine according to claim 6, wherein the insulating layer is made of an insulating tape made by mica paper mixed with glass cloth impregnated with resin.

10. The rotating electrical machine according to claim 6, wherein the insulating layer includes an inorganic filler resistant to discharging.

11. A coil comprising an insulator covering outside of a conductor, a resistance layer formed on a surface of the insulator, and at least one potential grading layer formed on a surface of the insulator adjacent to the resistance layer,
wherein, when the coil is provided extending from a core of a rotating electrical machine equipped with an electromagnetic shield, a boundary between the resistance layer and potential grading layer is positioned farther from the core than a point on a surface of the coil, wherein said point is defined by a shortest distance between the coil and a closest shoulder of the electromagnetic shield with respect to the core.

12. The coil according to claim 11, wherein:
the resistance layer has a surface resistivity of $10\Omega$ to $1 M\Omega$, and
the boundary between the resistance layer and potential grading layer is located in an area, wherein said area is defined between a first and a second position, said first position displaced 30 mm, from a point on a surface of the coil along a surface of the coil in a direction departing the core, and said second position displaced 100 mm, from a lead-out of the coil along a surface of the coil in a direction approaching the core, when the coil is provided extending from the core of the rotating electrical machine equipped with the electromagnetic shield.

13. The coil according to claim 11, wherein the boundary between the resistance layer and potential grading layer, and a boundary between adjacent potential grading layers, are not placed at each position on a surface of the coil, where a distance between the coil and each shoulder of the electromagnetic shield is the shortest, when the coil is provided extending from the core of the rotating electrical machine equipped with the electromagnetic shield.

14. The coil according to claim 11, wherein the boundary between the resistance layer and potential grading layer, and a boundary between adjacent potential grading layers, are parallel to a surface of the core, from which the coil extends, when the coil is provided extending from the core of the rotating electrical machine equipped with the electromagnetic shield.

15. The coil according to claim 11, further comprising an insulating layer formed on a surface of at least the potential grading layer.

16. The coil according to claim 11, further comprising an insulating layer formed on a surface of a part of the potential grading layer.

17. The coil according to claim 16, wherein the insulating layer is formed on a surface of a certain area starting from a joint between the resistance layer and potential grading layer, in a whole surface of the potential grading layer.

18. The coil according to claim 16, wherein the insulating layer is formed at a joint between the resistance layer and potential grading layer, and on a surface of a part having a surface resistance of $10^9 \Omega$ or less, in a whole surface of the potential grading layer.

19. The coil according to claim 16, wherein the insulating layer is made of an insulating tape made by mica paper mixed with glass cloth impregnated with resin.

20. The coil according to claim 16, wherein the insulating layer includes an inorganic filler resistant to discharging.

* * * * *